US009288517B2

(12) United States Patent
Andrews

(10) Patent No.: US 9,288,517 B2
(45) Date of Patent: Mar. 15, 2016

(54) METHOD AND APPARATUS FOR MOBILE COMMUNICATION BASED ORDERING OF ON-DEMAND DIGITAL CONTENT

(71) Applicant: TELVUE CORPORATION, Mt. Laurel, NJ (US)

(72) Inventor: Paul Andrews, Titusville, NJ (US)

(73) Assignee: TELVUE CORPORATION, Mount Laurel, NJ (US)

( * ) Notice: Subject to any disclaimer, the term of this patent is extended or adjusted under 35 U.S.C. 154(b) by 0 days.

(21) Appl. No.: 13/790,217

(22) Filed: Mar. 8, 2013

(65) Prior Publication Data

US 2013/0254786 A1  Sep. 26, 2013

Related U.S. Application Data

(60) Provisional application No. 61/608,391, filed on Mar. 8, 2012.

(51) Int. Cl.
*H04N 7/16* (2011.01)
*H04N 21/2543* (2011.01)
*H04N 21/4227* (2011.01)
*H04N 21/472* (2011.01)
*H04N 21/61* (2011.01)

(52) U.S. Cl.
CPC ....... *H04N 21/2543* (2013.01); *H04N 21/4227* (2013.01); *H04N 21/47202* (2013.01); *H04N 21/6181* (2013.01)

(58) Field of Classification Search
None
See application file for complete search history.

(56) References Cited

U.S. PATENT DOCUMENTS

| 8,341,675 | B2 * | 12/2012 | Chaudhry | 725/48 |
|---|---|---|---|---|
| 2004/0083296 | A1 * | 4/2004 | Metral | 709/229 |
| 2005/0076364 | A1 * | 4/2005 | Dukes et al. | 725/46 |
| 2007/0220575 | A1 * | 9/2007 | Cooper et al. | 725/118 |
| 2008/0109838 | A1 * | 5/2008 | Zureczki et al. | 725/5 |
| 2008/0288352 | A1 * | 11/2008 | Fogel | 705/14 |
| 2009/0007216 | A1 * | 1/2009 | Ku et al. | 725/142 |
| 2010/0306090 | A1 * | 12/2010 | Zargahi et al. | 705/34 |

(Continued)

OTHER PUBLICATIONS

"SMS Payment System", 2 pages downloaded on Feb. 27, 2012 http://www.sms-integration.com/how-to-utilize-sms-payment-solutions-in-your-business-138.html.

(Continued)

*Primary Examiner* — Nasser Goodarzi
*Assistant Examiner* — Adil Ocak
(74) *Attorney, Agent, or Firm* — Moser Taboada

(57) ABSTRACT

A computer implemented method and apparatus for mobile communication based ordering of on-demand digital content (such as video content in a network-based pay TV service). In some embodiments the mobile communication is via an SMS cell phone text and payment of the ordered content is by billing a financial account associated with the owner of the cell phone. The method generates for display to the user, upon selection of digital content desired to be ordered by the user and accessed by a specific network-enabled device associated with the user, a unique video activation request number (VARN), the VARN comprising a first component which uniquely identifies a specific one or more Internet-enabled devices and a second component that uniquely identifies the ordered digital content. Access by the Internet-enabled device to the ordered digital content is authorized only after receipt from a message-based mobile communication device of a communication message which includes the VARN is associated with the owner of the cell phone.

20 Claims, 2 Drawing Sheets

(56) References Cited

U.S. PATENT DOCUMENTS

2011/0023073 A1* 1/2011 McCarthy et al. ............. 725/98
2011/0265112 A1* 10/2011 Kwak .............................. 725/25
2011/0314378 A1* 12/2011 Nijim et al. ................... 715/716
2012/0089699 A1* 4/2012 Cholas .......................... 709/217

OTHER PUBLICATIONS

"SMS Mobile Payments", 1 page downloaded on Feb. 27, 2012 http://www.thepaymentguru.com/payment-methods/mobile-payments/sms-mobile-payments/.

* cited by examiner

METHOD AND APPARATUS FOR MOBILE COMMUNICATION BASED ORDERING OF ON-DEMAND DIGITAL CONTENT

CROSS REFERENCE TO RELATED APPLICATIONS

This application claims the benefit of U.S. Provisional Patent Application No. 61/608,391 filed Mar. 8, 2012, the disclosure of which is incorporated herein by reference in its entirety.

BACKGROUND OF THE INVENTION

1. Field of the Invention

Embodiments of the present invention generally relate to ordering on-demand digital content and, more particularly, to an ordering and billing system for On-Demand digital content via a mobile communication device.

2. Description of the Related Art

In the past few years, a new class of consumer television (TV) service has evolved based solely on Internet delivery as compared with cable or broadcast television delivery. Video On-Demand (VOD) subscribers can use personal computers (PCs) or low cost Internet connected devices having a video player included therein, to receive high quality video for a fee. In order to receive such services, customers typically are required to establish a subscriber account at a website by providing a name, address, and credit card information for billing. This "sign-up" process requires a PC and a web browser. During this process, the subscribers Internet video player, identified by a unique serial number, is linked to the valid subscriber account. The content provider collects payment from the credit card company and the subscriber can watch the video.

This has been a successful system but it requires the Internet pay TV subscriber to have a PC, a credit card, and an incentive to open an account. However, this credit card based process can be a barrier to sales. If a customer desires to view on-demand content and the customer does not have an account or if the content is a pay-per-view (PPV) type of experience, the customer must obtain a valid credit card, and input its information before continuing. This disrupts the viewing experience and may often lead the customer to simply abandon the idea of watching the desired content. A credit card is not always easily available or accessible. However, a cell phone user is rarely without their cell phone. It would simplify the payment process if a user could request video content through their cell phone and not require a credit card.

Therefore, there is a need in the art for an ordering and billing system for On-Demand digital content which does not require a credit card payment system.

SUMMARY OF THE INVENTION

The present invention generally comprises an SMS-based mobile communication device ordering and billing method for accessing digital content, and more specifically, using a cell phone SMS-based ordering and payment method for network-based pay TV. Once a cell phone user selects video content to be viewed through a network-enabled device associated with the cell phone user, the network-enabled device is identified, the content is identified and a video activation request number (VARN) is generated and displayed on a display coupled with the network-enabled device. The VARN is entered into the cell phone of the user requesting the content, and sent as a text message to a service provider of the video content. Payment for the content is effected by billing the financial account associated with the owner of the cell phone and the network-enabled device is then authorized to access the digital content.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the method and apparatus is described herein by way of example for several embodiments and illustrative drawings, those skilled in the art will recognize that the method and apparatus for mobile communication based ordering of on-demand digital content is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for mobile communication based ordering of on-demand digital content defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Additionally, the word "billing" as used herein refers to either one or both of validating a financial account to be charged a fee, as well as the act of charging of the fee and the phrase "network-enabled device" as used herein refers to any device that can couple to other devices via a wired or wireless digital communication path so as to access digital content.

DETAILED DESCRIPTION

Embodiments of the present invention provide a method and apparatus for mobile communication based ordering of on-demand digital content (such as video content). In some embodiments the mobile communication is via an SMS cell phone text and payment of the ordered content is by billing a financial account associated with the owner of the cell phone. A user may select video content to be viewed via an Internet-enabled device associated with the user. The method identifies the content selected for access via a unique identifier, identifies the user's Internet-enabled device via the device's unique identifier, and generates a unique video activation request number (VARN) which identifies the video content and the user's internet-enabled device, and displays the VARN to the user on a display. The user then inputs the VARN as a text message using the user's cell phone and sends the text message to request access to the content. The transmitted VARN is decrypted and once the user is identified and the cell phone account charged, access is authorized and the video content may be accessed by the Internet-enabled device for viewing by the user.

Figure 1:
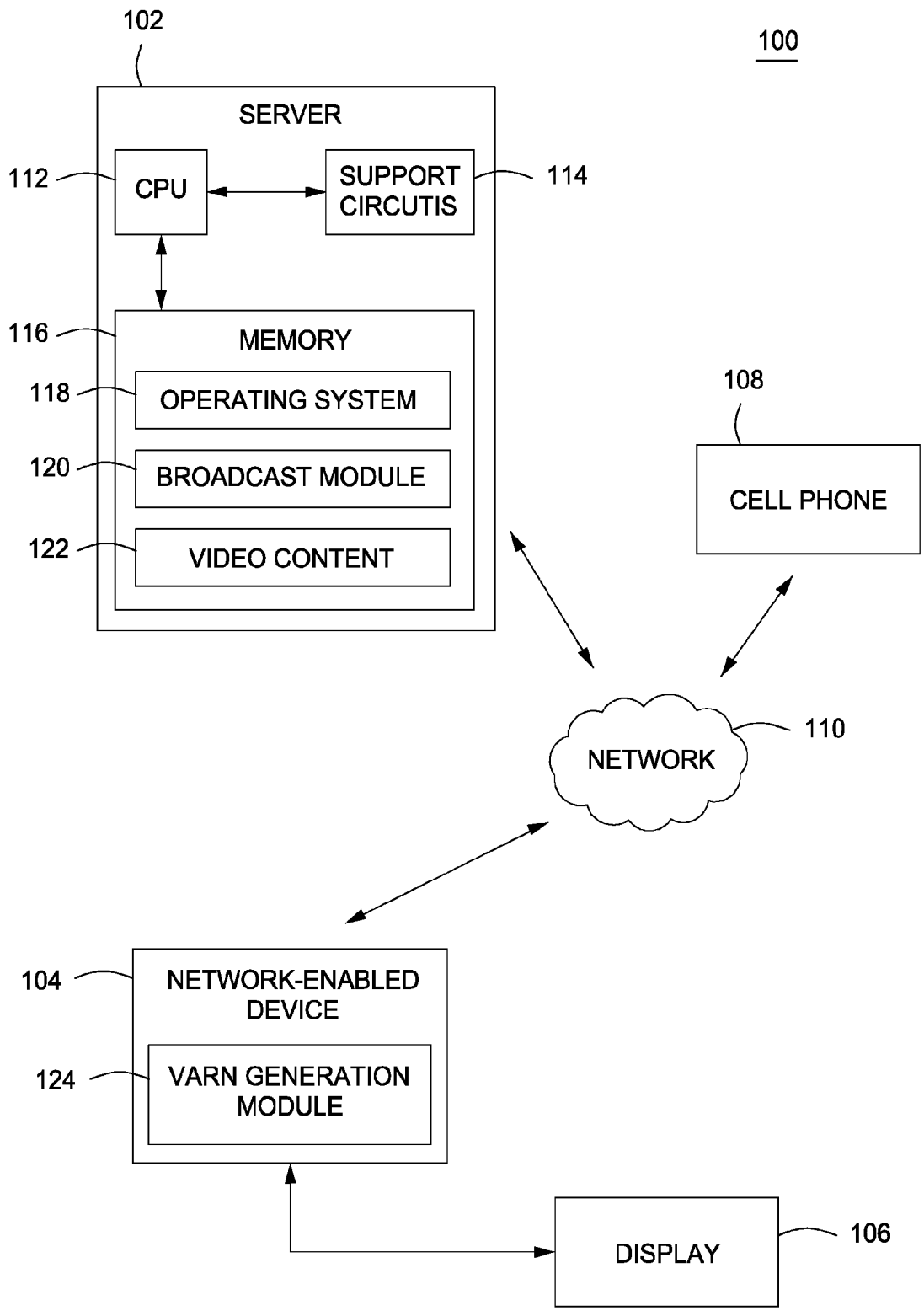
FIG. 1 is a block diagram of a system for mobile communication based ordering of on-demand digital content, according to several embodiments of the invention.

FIG. 1 depicts a computer system 100 comprising a server 102, an internet-enabled device 104, a display 106, a cell phone 108 and a communications network 110. The system 100 enables a user with a cell phone 108 to interact with the server 102 via the network 110.

The server 102 is a type of computing device known to one of ordinary skill in the art that is used for providing computing services within the cloud, e.g., a blade server, virtual machine, and the like. The server 102 includes a Central Processing Unit (CPU) 112, support circuits 114, and a memory 116. The CPU 112 may comprise one or more commercially available microprocessors or microcontrollers that facilitate data processing and storage. The various support circuits 114 facilitate the operation of the CPU 112 and include one or more clock circuits, power supplies, cache, input/output circuits, displays, and the like. The memory 116 comprises at least one of Read Only Memory (ROM), Random Access Memory (RAM), disk drive storage, optical storage, removable storage and/or the like. The memory 116 comprises an operating system 118, a broadcast module 120, and video content 122. The video content 122 may be a movie, a sporting event, a concert and/or the like. Additionally, video content 122 may comprise a time-based subscription to video content, such as a 1-year subscription to access a given one or more channels of a pay TV service, such as SHOWTIME®, HBO®, etc.

The network-enabled device 104 is a device that can couple to other devices via a wired or wireless digital communication path so as to access digital content, such as video content 122, for viewing on display 106, such as a TV screen. Accordingly, in one embodiment, the network-enabled device 104 may comprise a COMMCAST® television Set-Top-Box for accessing content from a provider of multi-media entertainment or in another embodiment, the network-enabled device 104 may comprise a device, such as a gaming console, Smart Phone, Tablet or personal computer, configured for accessing digital content via a wired or wireless Internet connection. The network-enabled device 104 contains a VARN generation module 124. The network-enabled device 104 is connected to the display 106. The network-enabled device 104 is a type of computing device (e.g., a personal computer, a Smart TV, a network-enabled game console, such as an Xbox® or PS3®, and/or any other network connected TV device, such as one or more ROKU® devices, known to one of ordinary skill in the art. The cell phone 108 is a type of computing device (e.g., a Personal Digital Assistant (PDA), a mobile phone and/or the like) known to one of ordinary skill in the art. The cell phone 108 is capable of sending and receiving SMS text messages.

The user of the cell phone 108 uses the network-enabled device 104 to select video content 122 to be viewed on the display 106. In response to a user selection of video content 122, the VARN generation module 124 generates a Video Activation Request Number (VARN), which uniquely identifies one or more of the network-enabled device 104 and the video content 122 the user has selected. A message containing the VARN is then displayed on the display 106. This VARN is input into the cell phone 108 and sent to the server 102 as an SMS text message. The broadcast module 120 on the server 102 receives the SMS text message and uses information from the SMS text to determine account information for the cell phone owner. The broadcast module 120 decrypts the VARN in order to identify the video content 122 that is to be accessed and the one or more network-enabled devices 104 from which the video content is to be accessed for viewing. The broadcast module 120 bills the cell phone account of the owner of the cell phone 108 from which the video content 122 was requested. The broadcast module then authorizes access by the network-enabled device 104 to the video content 122. Accordingly, the VARN can uniquely identify a plurality of network-enabled devices 104, such as three ROKU boxes, or one or more ROKU boxes and one or more video game consoles. Such "grouping" of a plurality of network-enabled devices 104 would require the user to communicate with server 10 in advance of ordering digital content, so as to establish within broadcast module 120 a common user ID/owner for the group. Thereafter, server 102 authorizes access for the identified group of network-enabled devices 104, instead of only one network-enabled device 104.

The network 110 comprises a communication system that connects computers by wire, cable, fiber optic and/or wireless link facilitated by various types of well-known network elements, such as hubs, switches, routers, access points and the like. The network 110 may employ various well-known protocols to communicate information amongst the network resources. For example, the network 110 may be a part of the Internet or Intranet using various communications infrastructure, such as Ethernet, Wi-Fi, Wi-Max, General Packet Radio Service (GPRS), and the like.

Figure 2:
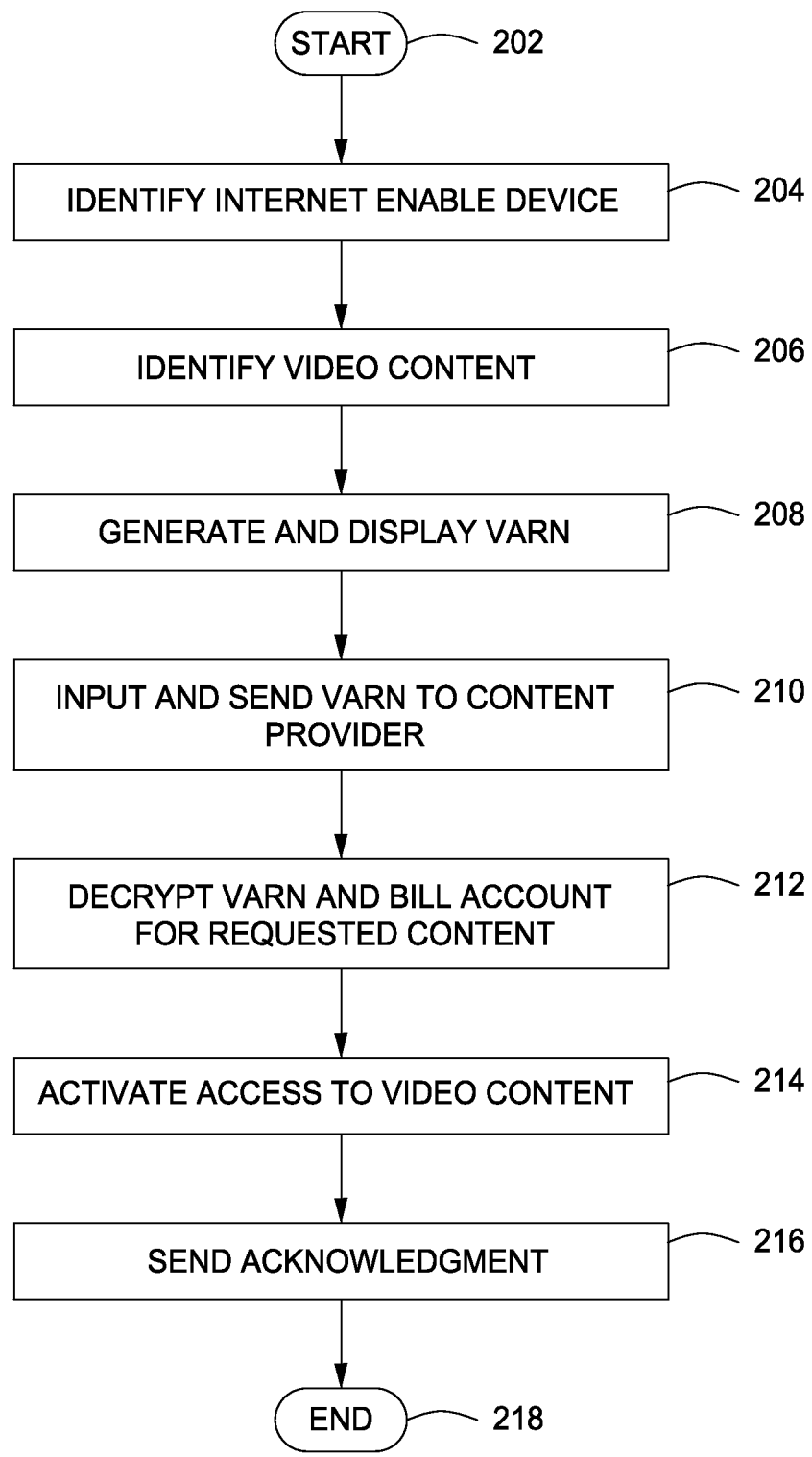
FIG. 2 is a flow diagram for billing on-demand digital content to a mobile communication device based on the content of a communication message sent by the mobile communication device, according to one or more embodiments of the invention.

FIG. 2 is a flow diagram of a method 200 for billing on-demand video content to a cell phone account based on a text message communicated, for example, via the cell phone, such as the text of an SMS text message, according to one or more embodiments of the invention. The method generates a VARN that identifies the network-enabled device and the video content requested. The method then displays the VARN for a user to input into their cell phone as a text message. The message is sent to a service provider on a cloud server where the VARN is decrypted, the user (typically the owner of the cell phone) is validated, and the cell phone owner's account charged for the identified video content. Access to the video content is then authorized to the network-enabled device, so the video content may be displayed to the user. The method enables ordering video on-demand (VOD) without the use of a credit card or the entering of personal information.

The method 200 begins at step 202 and proceeds to step 204. At step 204, the method 200 identifies a network-enabled device requesting selected digital content, such as video content. The network-enabled device has a unique identifier that will inform the content provider exactly where to authorize access of the selected video content. The method 200 proceeds to step 206. At step 206, the method 200 identifies the selected video content. The video content also has a unique identifier. The identifier defines the exact version (3D, widescreen, etc.) of the video content the user wishes to view. The method 200 proceeds to step 208. At step 208, the method 200 generates and causes display of a VARN identifying the selected video content and the network-enabled device. In some embodiments, a message is displayed instructing to cell phone user, "To buy the video content, please text [the generated VARN] to [a service provider]." In some embodiments, the VARN is an alpha-numeric code. In other embodiments, the VARN is a QR code or other 2-dimensional image. The method 200 proceeds to step 210.

At step 210, the VARN is input onto the cell phone by the cell phone user. The VARN is input as an SMS text message and sent to the broadcast service provider. The cell phone user may type the VARN into the cell phone using a cell phone keypad (not shown). The VARN may be a QR code, in which case it may be transferred to the cell phone using a cell phone camera (not shown). Those skilled in the art can appreciate the various methods of transferring the VARN from the display to the cell phone. The method 200 proceeds to step 212. At step 212, the VARN is decrypted. The VARN identifies the network-enabled device and the video content selected to be accessed. The SMS text message contains information regarding the cell phone owner (typically the user), as well as account information associated with the owner. The cell phone user will have their purchase charged to the cell phone account of the cell phone owner. The method 200 proceeds to step 214. At step 214, the network-enabled device is activated to access the video content. The method 200 proceeds to step 216. At step 216, an acknowledgement is sent by way of SMS text message to the cell phone that ordered the video content. In some embodiments, the acknowledgement is a simple message reading, "Enjoy the show!" In other embodiments, the acknowledgement includes transaction and billing information. The method 200 proceeds to step 218 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module".

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. For example, although the cell phone 108 comprises the wireless device used for ordering the digital content, other wireless devices could be used. Thus, the wireless device may comprise just a mobile internet enabled device 104 and a display 106, such as a tablet device including a voice over IP application (such as SKPYE that has a user billing account associated therewith). The described embodiments were chosen in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to the described embodiments of the present invention, other and further embodiments of the invention may be devised without departing from the basic scope thereof, and the scope thereof is determined by the claims that follow.

The invention claimed is:

1. A computer implemented message-based mobile communication ordering and billing method for user ordering of video content for display on a specific network-enabled device, comprising:
    providing information to a user relating to video content available to be ordered from a service provider for access by a network-enabled device;
    receiving a selection of video content desired to be ordered by the user and accessed by a specific network-enabled device that does not have a customer account with the service provider for the selection of video content;
    generating a unique video activation request number (VARN) comprising a first component which uniquely identifies the specific network-enabled device and a second component that uniquely identifies the video content desired to be ordered from the service provider and transmitting the VARN to the user;
    receiving a communication message transmitted from a mobile device of the user, the communication message comprising at least the VARN;
    processing the received communication message by decrypting the VARN to identify the mobile device that sent the communication message and the selection of video content;
    determining a financial account to which ownership costs associated with operation of the mobile device are billed; and
    authorizing access by the specific network-enabled device to the selection of video content when charging the financial account is complete, to which ownership costs of the message-based mobile communication device are billed, wherein the access is authorized by the service provider,
    wherein the specific network-enabled device and the mobile device are not the same device.

2. The method of claim 1, where the service provider provides the selection of video content as part of a network-based pay TV service and neither one of the specific network-enabled device nor the mobile device have a customer account with the service provider.

3. The method of claim 1, where the communication message including the VARN is transmitted using a cellular phone.

4. The method of claim 1, where the communication message including the VARN is transmitted as an SMS-based text message.

5. The method of claim 1, where the communication message includes as the VARN a 2-dimensional image.

6. The method of claim 1, where the VARN identifies a time-based subscription to access the selection of video content.

7. The method of claim 1, where the specific network-enabled device is coupled with a display for displaying the VARN.

8. The method of claim 7, where the VARN is generated by the specific network-enabled device.

9. The method of claim 7, where the VARN uniquely identifies multiple network-enabled devices associated with a common user.

10. The method of claim 7, where the specific network-enabled device and coupled display comprise a TV.

11. The method of claim 7, where the specific network-enabled device comprises a video game console.

12. A computer implemented message-based mobile communication ordering and billing system, comprising:
a server for,
providing information to a user relating to video content available to be ordered by a user from a service provider for access by a specific network-enabled device identified by the user;
receiving a selection of video content desired to be ordered by the user and accessed by a specific network-enabled device that does not have a customer account with the service provider for the selection of video content;
generating a unique video activation request number (VARN) comprising a first component which uniquely identifies the specific network-enabled device and a second component that uniquely identifies the video content desired to be ordered from the service provider and transmitting the VARN to the user;
receiving a communication message transmitted from a mobile device of the user via a message-based mobile communication device, the communication message comprising at least the VARN;
processing the received communication message by decrypting the VARN to identify the mobile device that sent the communication message and the selection of video content;
determining a financial account to which ownership costs associated with operation of the identified mobile device are billed; and
authorizing access by the specific network-enabled device to the selection of video content when charging the financial account is complete, to which ownership costs of the message-based mobile communication device are billed,
wherein the specific network-enabled device and the message-based mobile communication device are not the same device wherein the specific network-enabled device does not have a an existing customer account with the service provider for billing of the selection of video content.

13. The system of claim 12, where the server is part of a network-based pay TV service and neither one of the specific network-enabled device nor the message-based mobile communication device have a customer account with the service provider.

14. The system of claim 12, further including a cellular phone as the mobile device.

15. The system of claim 14, wherein the cellular phone transmits the VARN as an SMS-based text message to the server.

16. The system of claim 12, where the VARN uniquely identifies multiple network-enabled devices associated with a common user.

17. The system of claim 12, further including a display coupled with the specific network-enabled device for displaying the video content that was authorized for access.

18. The system of claim 12, where the specific network-enabled device generates and causes display of the VARN.

19. The system of claim 12, further including a display coupled with the specific network-enabled device for displaying the VARN.

20. The system of claim 12, where the VARN identifies a time-based subscription to access digital video content.

* * * * *